Dec. 22, 1925.  
M. LASKA  
1,566,885

AUTOMOBILE LOCKING DEVICE

Filed June 17, 1924

WITNESSES:
Cris Feink.
Robert J. Hulziger.

INVENTOR,
Mathias Laska.
BY
ATTORNEYS.

Patented Dec. 22, 1925.

1,566,885

UNITED STATES PATENT OFFICE.

MATHIAS LASKA, OF NEW ORLEANS, LOUISIANA.

AUTOMOBILE LOCKING DEVICE.

Application filed June 17, 1924. Serial No. 720,712.

*To all whom it may concern:*

Be it known that I, MATHIAS LASKA, a citizen of the United States, and a resident of New Orleans, in the parish of Orleans and State of Louisiana, have invented a new and Improved Automobile Locking Device, of which the following is a full, clear, and exact description.

This invention relates to a locking device for automobiles.

An object of the invention is to provide a simple, efficient, strong and durable means whereby a plurality of operating levers on an automobile may be simply and quickly locked to prevent operation when desired.

Another object concerns the provision of means whereby the locking device can be readily removed out of the way when not in operation.

A further object concerns the provision of means whereby the movement of one part of the locking device to locking position will move the entire device, and whereby the locking of one part of the device will effect the locking of the remainder.

A still further object concerns the provision of means which is simple in construction and operation, economical to manufacture, and capable of being applied to an automobile very easily.

The invention is illustrated in the drawings, of which—

Figure 1:
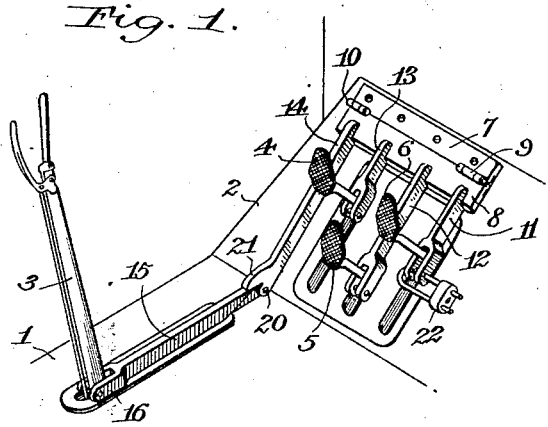
Figure 1 is a perspective view of the floor and footboard of an automobile, showing the locking device in locked position.

The form of the invention shown in the drawings is a preferred form, although it is understood that modifications in the construction and arrangement of the parts and in the character of the materials used may be adopted without departing from the spirit of the invention as set forth in the appended claim.

In its general aspect the invention is applicable to an automobile in which a plurality of operating levers are to be locked and it is desirable to, if possible, lock them all together by means of one device. To this end I provide a plurality of locking arms, each connected to a common pivoted member attached to the floor or footboard of a car so that when the pivoted member is moved the locking arms are moved into association related with their respective operating elements. By reason of the common rigid connection of each arm to a common supporting element the locking of one arm to its operating element will effect the locking of the others with respect to their operating elements.

A further aspect of the invention includes an extension locking arm formed of two or more sections pivoted together which are adapted to extend to one of the operating elements disposed further away from the support than the others and relates to means whereby when the sections are extended one section will lock with another to prevent it from being moved to an inoperative position.

As shown in the drawings, the preferred embodiment of the invention relates to an automobile having a floorboard 1 and a footboard 2. The automobile is also provided with a brake lever 3 and operating foot pedals 4, 5 and 6. Associated with the footboard is a plate 7 to which a movable plate or support 8 is pivoted by means of hinges 9 and 10. Rigidly connected to the movable support 8 and extending therefrom are locking arms 11, 12, 13 and 14. The arm 14 at its upper end is pivotally connected to an extension frame 15. The outer ends of the arms are provided with lugs 16, 17, 18 and 19 which are adapted to embrace the respective operating elements.

Figure 3:
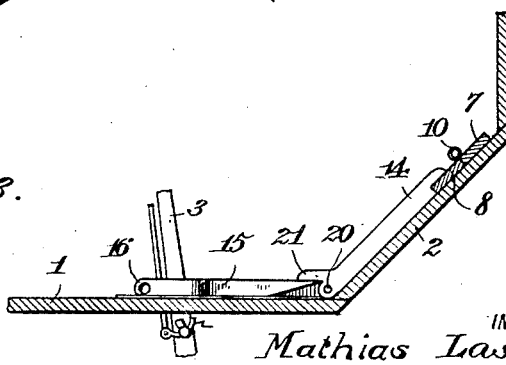
Fig. 3 is a section taken through the device in the locked position.

The arm 14 is connected at 20 to the arm 15, and the outer end of the arm 14 is provided with a projecting flange 21 adapted to overlie the upper edge of the arm 15 adjacent the pivot point 20 when the arm 15 is in its extended position, shown in Figs. 1 and 3. By reason of this overlying of the flange 21, the arm 15 cannot be lifted to remove the lug 16 from the lever 3 when the arm 14 is in its operative position.

Figure 2:
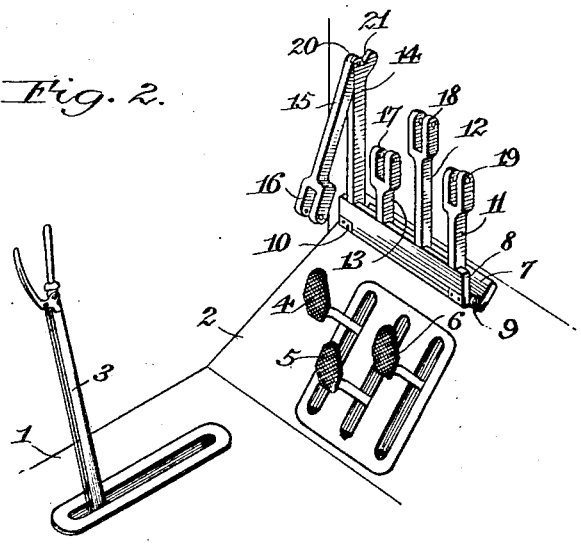
Fig. 2 is a similar view showing the device in an unlocked position.

When the locking device is not in use the pivoted support 8 is moved to the position shown in Fig. 2, with the arm extending substantially vertical, out of the way. However, when in use the pivoted plate is moved downwardly along the floorboard, and each locking arm, with its lug member, is associated with its respective operating element. Because of the rigid connection between the locking arms and the pivoted support 8, if a lock 22 is passed through apertures in the lug 19 it will lock the lug to the pedal 6, and by reason of the rigidity will lock the other arms in association with their operating elements. In this way, therefore, it is impossible to release the brake or to operate any of the foot pedals. This particular device is especially applicable to an automobile of the Ford type.

It will thus be seen that I have provided a simple and efficient device for simultaneously locking a plurality of operating elements, a locking device which can be economically manufactured and readily applied to any type of automobile.

What I claim is:—

A locking device for automobiles having an operative element extending through the floorboard, which comprises a pivoted plate connected to the board, an arm connected to said plate, a second arm pivoted to said first arm at its outer end, means for moving the plate to dispose it along the floorboard, said arms in this position of the plate being extended, and means on the first arm to lie over the second arm in its extended position to limit its movement in one direction, said second arm adapted when thus extended to engage the operative element.

MATHIAS LASKA.